Figure 1:
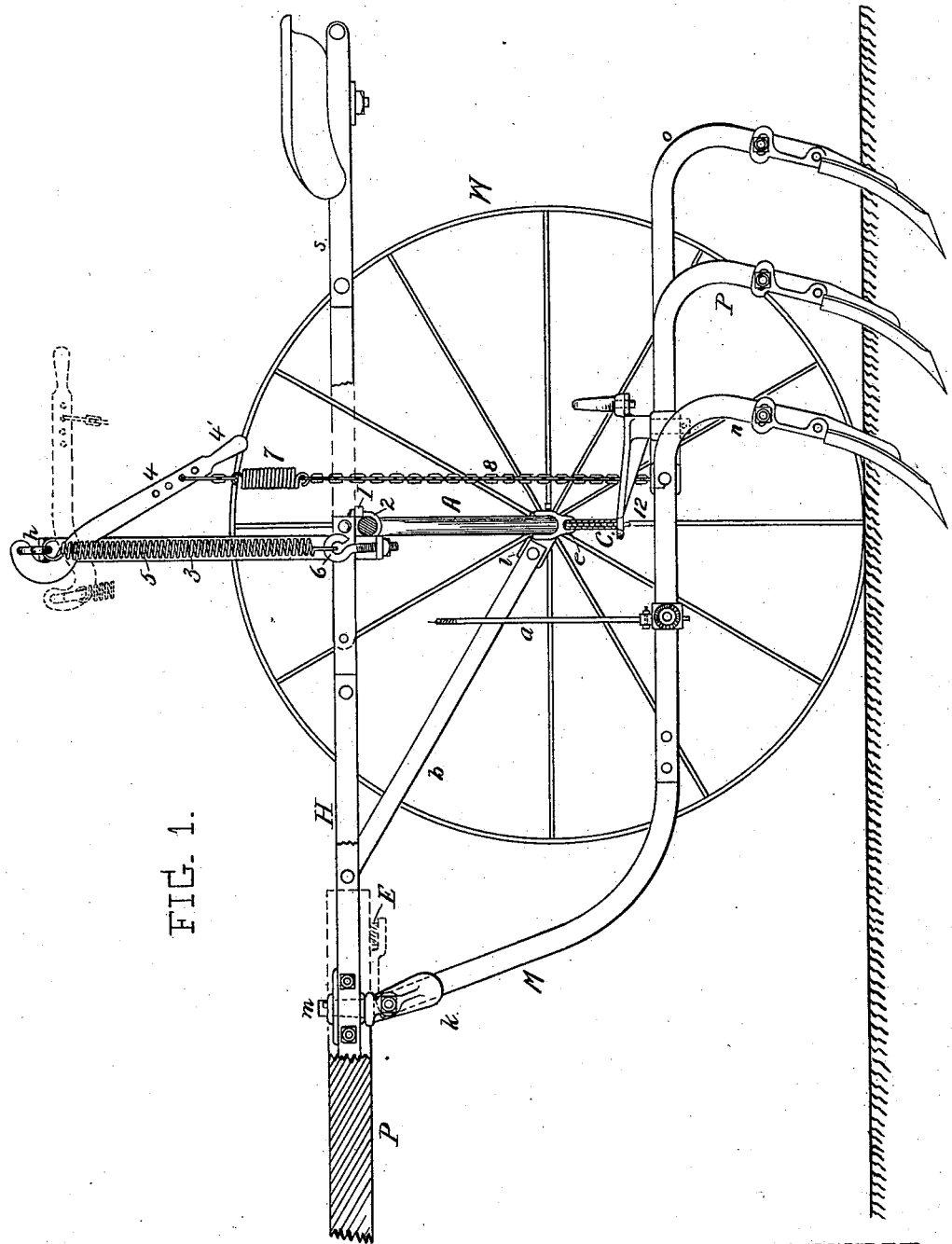

(No Model.)  4 Sheets—Sheet 1.

C. E. WHITE.
RIDING CULTIVATOR.

No. 601,330. Patented Mar. 29, 1898.

WITNESSES— INVENTOR—
Charles E. White
by
Harold A. Weld
Attorney—

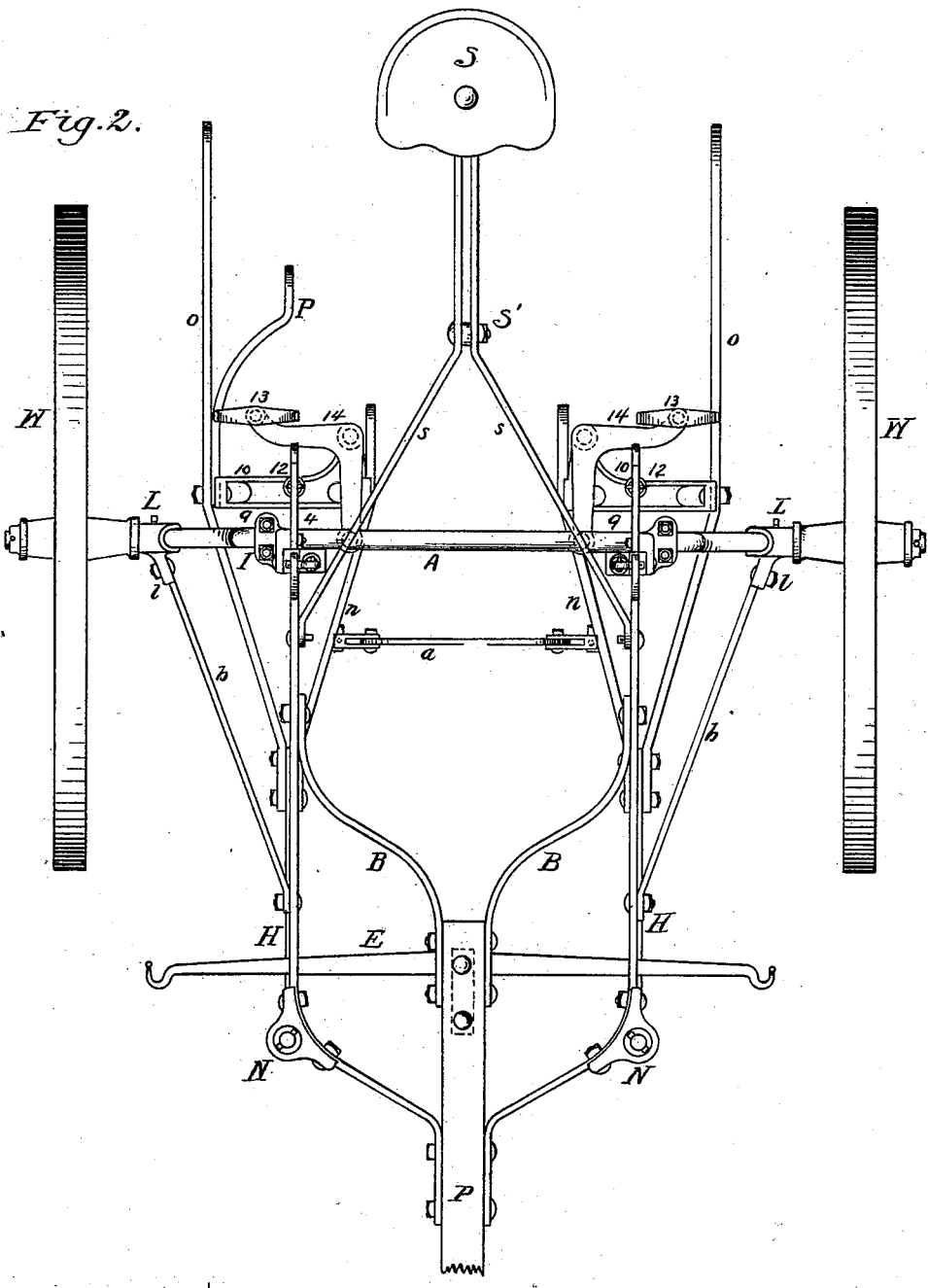

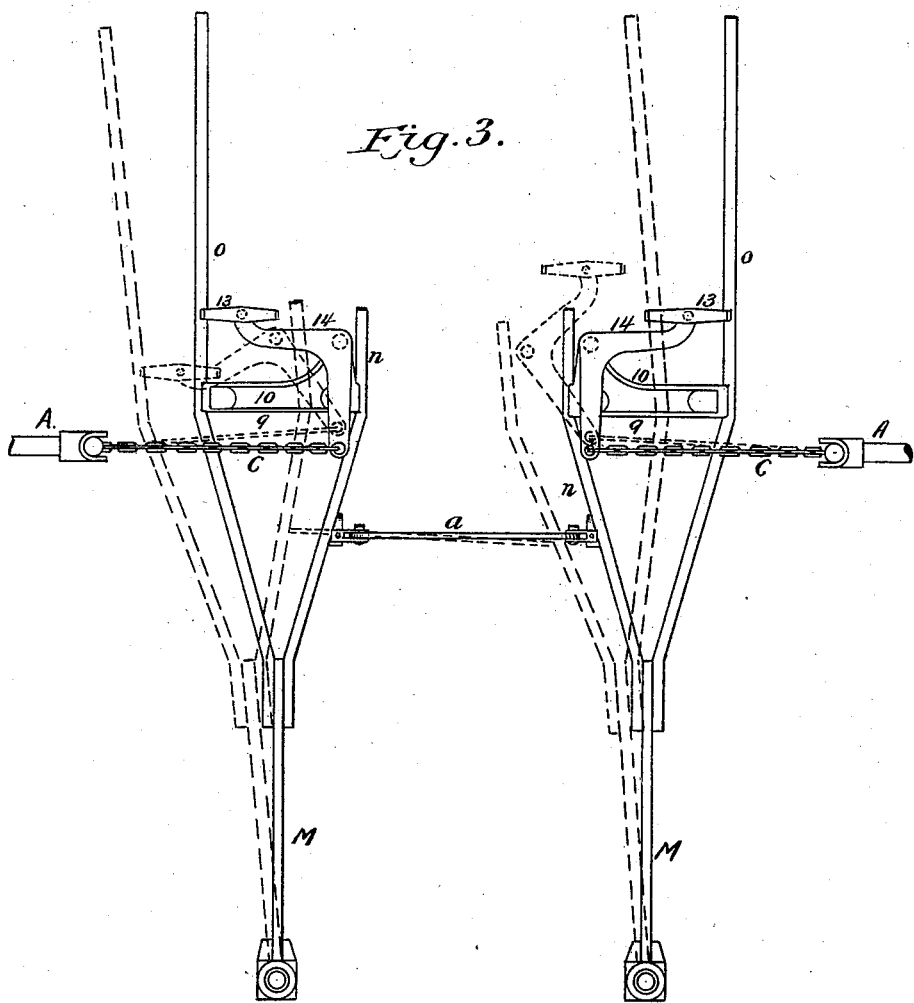

(No Model.)　　　　　　　　　　　　　　　　4 Sheets—Sheet 4.
C. E. WHITE.
RIDING CULTIVATOR.
No. 601,330.　　　　　　　　　Patented Mar. 29, 1898.
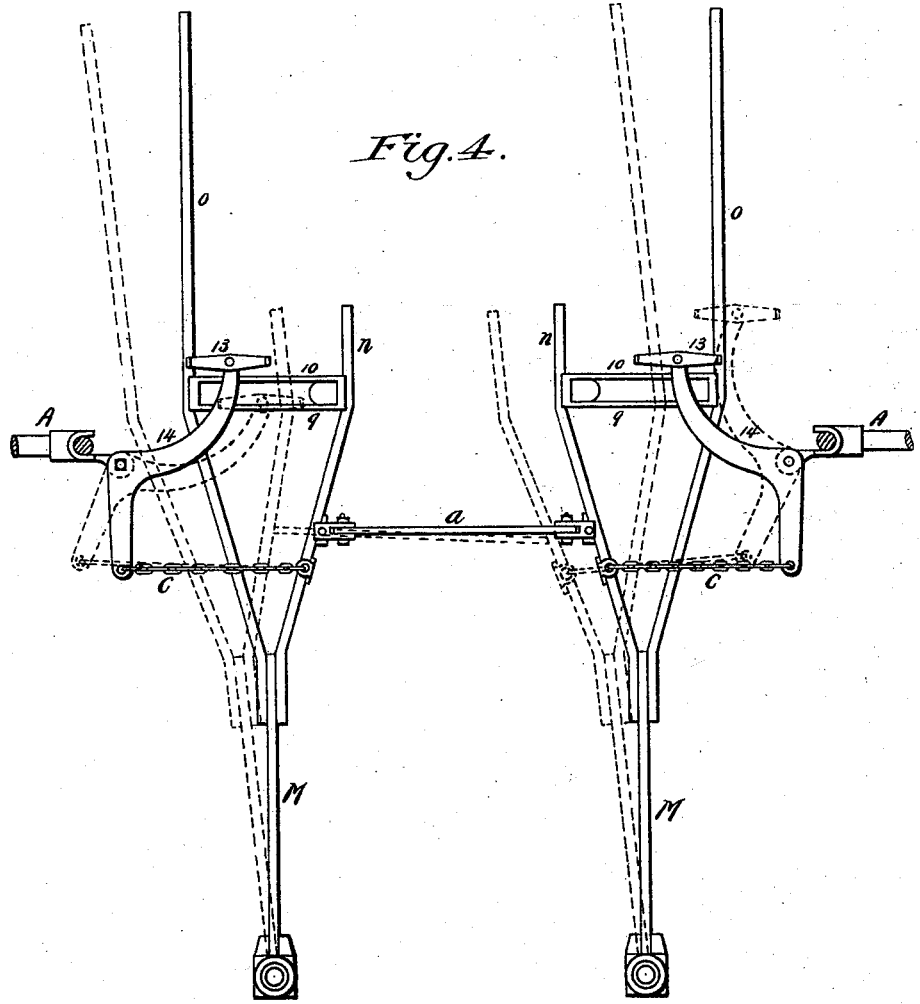
WITNESSES.
R. H. McCoy
L. A. White
INVENTOR.
Charles E. White
by Harold A. Weld
Attorney

UNITED STATES PATENT OFFICE.

CHARLES E. WHITE, OF MONMOUTH, ILLINOIS, ASSIGNOR TO THE WEIR PLOW COMPANY, OF SAME PLACE.

RIDING-CULTIVATOR.

SPECIFICATION forming part of Letters Patent No. 601,330, dated March 29, 1898.

Application filed February 1, 1895. Serial No. 537,006. (No model.)

*To all whom it may concern:*

Be it known that I, CHARLES E. WHITE, a citizen of the United States, residing at Monmouth, in the county of Warren and State of Illinois, have invented certain new and useful Improvements in Riding-Cultivators, whereof the following is a specification.

My invention relates to that class of riding-cultivators, having gangs of shovel-beams adapted to straddle the row cultivated, wherein the operator sits on a seat at the rear of the machine and moves the gangs of shovel-beams from side to side in cultivating the row.

A leading object of my invention is to provide means for the movement of the gangs of shovel-beams from side to side while the machine is in operation, so as to enable the operator to adapt the position of the shovels to the proper cultivation of plants outside the line of row of plants, by the use of levers fulcrumed or bearing upon the framework of the cultivators and imparting lateral motion to the gangs of shovel-beams.

Another leading object is to provide an improved means of raising and sustaining the shovels out of the ground when they are not in use.

Another object is to construct a light and strong framework for the cultivator and so to arrange and dispose the parts thereof that the least possible obstruction may be offered to the view of the row of plants cultivated by the operator.

Another object is to combine certain other novel improvements in the construction, combination, correlation, and arrangement of the various parts of the cultivator, whereby a simple, inexpensive, and efficient machine is secured.

In the drawings accompanying and forming a part of this specification, Figure 1 is a longitudinal section through the center of the machine, showing the arrangement of the beam and apparatus for raising it. Fig. 2 is a plan view of the machine from above. Fig. 3 is a plan of the beams, illustrating their mode of operation with the foot-levers. Fig. 4 shows a modification of the arrangement and attachment of the foot-levers with and to the gangs of shovel-beams and framework of the machine.

Similar characters of reference refer to the same parts in the several views.

W W are the wheels, and A the arched axle, which, with the pole P and the hounds H H, extending backward and firmly secured to the top of the arch of the axle, form the framework of the machine.

The framework is strengthened by the braces B B, bolted to the pole at its rear end and to the hounds midway their length. The evener E is secured to the rear of the pole in the usual manner. The seat S is adjustably secured to the rear ends of the arms s s, whose forward ends are respectively bolted to the right and left hounds, and passing backward rest upon the top of the arch of the axle and approach each other until they are in close proximity at S', Fig. 2, whence they extend backward in parallel lines for a convenient distance. The framework is also strengthened by the braces b b, bolted to the hounds a short distance in the rear of the line of the evener and extending downward and backward and being bolted to a lug l on the sand-guard L. The sand-guard L fits over the end of the axle and flanges over the inner surface of the hub of the wheel, so as to prevent sand from working into the bearing, and besides the lug l, already referred to, it bears the ear e, to which is attached the chain C hereinafter referred to.

Each of the hounds H H bears a bracket-box N, through which passes a stud m, and is secured above the box by a key and washer, so as to form a vertical pivot. The lower end of the stud m, passing below the bracket-box, is divided into two jaws k, between which is swung the end of the beam M on a horizontal pivot, the vertical and horizontal pivot together constituting a universal joint. The beam M extends downward and backward, as shown in Fig. 1, for a convenient distance, and to it are bolted the shovel-beams n and o, extending backward and diverging in opposite directions from the line of the beam M, the outer shovel-beam o extending backward the greater distance. A third shovel-beam P may be secured to the inner side of the outer shovel-beam o and curves inward, bearing a shovel at a point midway between the shovels borne by the shovel-beams n and o. This is shown attached in the right-hand gang in Figs. 1 and 2. The inner beams n n are bound together by the arched coupling-bar a, to which they are pivotally connected.

The shovels are raised and lowered by the following-described device: The bracket I, firmly secured to the top of the arched axle near its downward bend by a U-bolt 2, affords a flat surface for bolting the hound H and also a firm attachment for the standard 3, which rises vertically and has its upper end turned inward at right angles, while its lower end extends below the hound and is also turned in. Near the top of the standard 3 is pivoted the hand-lever 4. The forward end of the lever 4 is bent into a semicircular form and its rear end is extended backward and is perforated horizontally with a number of holes and terminates in a handle 4'. (See Fig. 1.) The lever 4, near its forward extremity, bears a hook h, extending inward, which holds a coiled spring 5, extending downward and fastened at the bottom to the eyebolt s, which passes through the lower turned-in end of the standard 3. A link passing through some one of the holes in the rear end of the lever 4 holds a second spring 7, from which a chain 8 extends downward and is attached to the shovel-beams. When the rear end of the lever 4 is thrown down, as shown in Fig. 1, the hook n is brought upward to a point in line with the pivoted bearing of the lever 4 on the standard 3 and with the eye of the bolt 6, the upper bent end of the standard operating as a stop on the lever and preventing the hook h from carrying the spring to the rear of the line referred to. It is evident that when in this position the spring, though exerting a powerful pull, does not tend to raise the shovels from the earth. When, however, the handle 4' of the lever is raised, the hook h is carried forward from the line of the bearing and the bolt-eye, and the spring 5, though acting on the short arm of the lever, is so strong that it operates powerfully to raise the shovels.

Owing to the peculiar shape of the forward end of the lever 4 the higher the handle is raised the longer the arm of the lever upon which the spring 5 pulls, so that since the tension of the spring is not materially changed by the operation the farther the shovels are raised the greater the proportion of the work done by the spring and the less by the operator until, when the lever is in the position shown by the dotted lines in Fig. 1, the spring 5 holds the shovels out of the ground. A slight pull on the lever or slight pressure with the feet upon the foot-levers, hereinafter described, on the part of the operator lowers the shovels, and by the arrangement shown but little greater exertion suffices to raise them into position for carrying.

The spring 7 enables the operator by foot-pressure to cause the shovels to run deeper and to adapt them to the inequalities in the surface of the ground, and also relieves sudden strains upon the parts caused by the shovels striking obstructions.

The shovel-beams n and o are braced apart by the transverse bars 9 and 10, made integral with longitudinal bars joining their ends and fitting snug against the inner surfaces of the shovel-beams, flanging over and under them, and bolted securely to them. These bars 9 and 10 are parallel through a part of their distance, but near its inner end the rear bar 10 is carried backward for a distance equal to about one-half the distance between the shovel-beams. An eye at 12 on the bar 10 furnishes a convenient means of attachment for the chain 8. The shovels are held in the ground by the weight of the beams and the suction of the earth upon the shovels, which is amply sufficient for that purpose. The depth to which they run is regulated by varying the length of the chain 8. The proper relation between the pull of the spring 5 upon the forward end of the lever 4 and the weight of the shovels and shovel-beams sustained by the rear end of the same is secured by suspending the shovel-beams from the lever at the proper distance from the fulcrum.

I will now describe the means I prefer for imparting lateral motion to the shovel-beams. Upon and above the rear inner extremity of the brace-bar 10 is pivoted the foot-lever 14. This foot-lever extends from its pivot on the brace-bar 10 forward, parallel with the line of draft of the machine, to a point directly under the arch of the axle, where it is held by the chain C, above referred to, extending inward from the said guard. The foot-lever extends from its pivot, also at right angles to the line of draft, outwardly for about the same distance it extends forward and bears on its outward end a foot-rest 13. The result of this arrangement is that the foot-lever 14 is a right-angled lever of the second class, the fulcrum being at the inner forward end, the power applied at the outer rear end, and the weight to be moved being at the right angle midway between them.

Owing to the peculiar shape of the foot-lever and its adjustment with relation to the beam the line of the force exerted upon the gang of shovel-beams is approximately at right angles to the line of the beam. By this arrangement no component of said force is lost by being exerted in the direction of the beam.

The fulcrum upon which the foot-lever works being movable enables the foot-lever to adapt itself to the varying positions of the gang as it moves to the right and left, so that the foot-lever maintains the same relative position with reference to the beam and gang, and the force exerted by the foot-lever acts at the same angle to the line of the beam in the various positions occupied by the gang as it moves laterally. At the same time by reason of the movement of the fulcrum as aforesaid the weight and power arms of the foot-lever bear the same relative proportion each to each throughout the motion of the foot-lever and gang.

Fig. 3 shows the manner in which the sidewise movement of the gangs is accomplished by the means described. The gangs of beams being in their normal position shown by the lines in said Fig. 3 and being connected by the rigid lever a, as described, the operator, desiring to throw them to the right, presses with his right foot upon its foot-rest and at the same time relaxes the pressure of his left foot. The right foot-rest moves forward and slightly outward and the left moves backward and slightly inward, bringing both gangs of beams into the position shown by the dotted lines in Fig. 3. In like manner they may be thrown in the opposite direction by relaxing the pressure of the right foot and exerting that of the left, the operator thus having the shovels easily under control. The seat is adjusted at a convenient distance to the rear of the foot-rests and the shovels are thrown by a natural motion of the feet of the operator. The open framework of a cultivator constructed as herein described enables the operator to have a good view of the row of plants cultivated, and by the means described he is able to operate the machine with a minimum effort. The wheels are made large to avoid jolting and secure evenness of draft.

While I prefer the arrangement of the foot-levers upon and in relation to the framework and gangs hereinbefore set forth, I do not confine myself thereto. Various modifications thereof can be made without departing from the spirit of my invention, whereby the same or similar results can be obtained—that is to say, the movements of the gangs of shovel-beams from side to side by means of levers fulcrumed or bearing upon the framework of the plow and operating reciprocally and approximately at right angles to the line of the respective gangs as the same move alternately to the one side and the other. For instance, the levers may be pivoted upon the axle and connected by chains with the gangs of beams, as shown in Fig. 4. The object of my invention may be accomplished by either of these described means and by other equivalent arrangements, combinations, and correlations of parts, and I contemplate the possibility of employing on occasions some or all of them in cultivators of various patterns. Nevertheless I prefer for most uses the form first described.

Having thus described my invention, what I claim as new, and desire to secure by Letters Patent, is—

1. In a riding-cultivator, a gang of shovel-beams in combination with a bell-crank foot-lever pivoted at the apex of its angle to the gang and attached at its forward end by a chain to the rigid framework of the cultivator, said chain allowing motion approximately parallel to the line of draft of the machine to the forward end of the lever, substantially as described.

2. In a riding-cultivator, the combination with the frame, and the gang of shovel-beams pivoted thereto, of a bell-crank foot-lever having its angle portion pivoted upon one of said parts and having a connection between its longitudinally-extended end and the other part permitting pivotal movement, substantially as described.

3. In a riding-cultivator, a pole, wheels and an arched axle, hounds extending from the pole to the top of the arched axle, a seat in rear of the arched axle, in combination with gangs of shovel-beams having downwardly-extended ends carrying shovels, said shovel-beams being pivotally swung from the hounds so that in their lateral movement their downwardly-extended ends shall always occupy planes perpendicular to the surface of the ground, an arched bar connecting said beams, foot-levers pivoted upon said gangs in rear of the axle and having longitudinally-extended ends terminating beneath the axle, link connections from said ends to the axle, the opposite ends of said levers being bent outward at right angles and pedals on said outwardly-bent ends, substantially as described.

4. In a riding-cultivator, a gang of shovel-beams in combination with a foot-lever pivoted upon said gang and bearing upon a movable fulcrum, substantially as described.

5. In a riding-cultivator, the combination with the frame of the gangs of shovel-beams pivoted thereto and connected together by a transverse bar so as to move simultaneously from side to side, of foot-levers pivoted upon said gangs and connected by movable fulcrums with the frame, substantially as described.

6. In a riding-cultivator, the combination with the frame and the gangs of shovel-beams, of the bell-crank foot-levers having their angle portions pivotally connected to said gangs, their longitudinally-extending ends linked to the frame, and their laterally-extended ends provided with foot-pedals, substantially as described.

7. In a riding-cultivator, the combination with the frame and gangs of shovel-beams swung therefrom by universal joints in front of the axle and extending backward beneath the axle, the foot-levers having their central portions pivotally connected with the gangs and their inner ends linked to the frame and foot-pedals mounted upon their outer ends, substantially as described.

8. In a riding-cultivator, the combination with the frame and gangs of shovel-beams swung therefrom by universal joints in front of the axle and extending downward and backward to the rear of the axle, a transverse connecting-bar for keeping said gangs a uniform distance apart, right and left foot-levers pivoted upon the respective gangs at their central portions with their inner ends linked to the frame and foot-pedals mounted on their outer ends, substantially as described.

9. In a riding-cultivator, the combination with the frame of the gangs of shovel-beams having downward extensions carrying shovels, said gangs being adapted to be moved from side to side while maintaining their said extensions in a vertical plane, a rigid bar connecting said gangs, bell-crank foot-levers pivoted to the gangs, link connections from the foot-levers to the frame, and hand-levers adapted to raise the gangs, substantially as described.

10. In a riding-cultivator, the combination of gangs of shovel-beams connected by a rigid bar 10, with foot-levers 14, 14, pivoted upon the respective gangs of shovel-beams and fulcrumed upon the ends of the chains c, c, attached to the axle A, substantially as described.

11. In a riding-cultivator, in combination, gangs of shovel-beams, foot-levers pivoted upon said shovel-beams, chains connecting the axle with one end of each foot-lever and a rigid bar connecting said gangs, substantially as described.

12. In a riding-cultivator, beams M, M, respectively bearing shovel-beams n, o, n, o, foot-levers 14, 14, chains C, C, and a connecting-rope 8 in combination with levers 4, 4, chains 8, 8, and springs 5, 5, substantially as described.

13. In a riding-cultivator, in combination with the beam M, a chain 8, spring 7, lever 4, standards 3, and spring 5, substantially as described.

14. In a wheeled cultivator, the combination of a pole P, hounds H, H, an axle A, arms s, s, and the seat S with standards 5, 5, springs 3, 3, levers 4, 4, chains 8, 8, and gangs of shovel-beams adapted to be raised and sustained by said levers, and springs operating upon and with said standards, substantially as described.

CHARLES E. WHITE.

Witnesses:
HAROLD A. WELD,
W. H. SEXTON.